United States Patent
Bellier et al.

(10) Patent No.: US 7,240,270 B2
(45) Date of Patent: Jul. 3, 2007

(54) METHOD OF TRANSMITTING SIGNALING MESSAGES IN A MOBILE TELECOMMUNICATIONS NETWORK

(75) Inventors: Thierry Bellier, Helsinki (FI); Harri Jokinen, Hiisi (FI); Benoist Sebire, Helsinki (FI)

(73) Assignee: Nokia Corporation, Espoo (FI)

( * ) Notice: Subject to any disclaimer, the term of this patent is extended or adjusted under 35 U.S.C. 154(b) by 1345 days.

(21) Appl. No.: 09/845,823

(22) Filed: Apr. 30, 2001

(65) Prior Publication Data

US 2002/0194566 A1 Dec. 19, 2002

(51) Int. Cl.
- G06F 11/00 (2006.01)
- H03M 13/00 (2006.01)
- H03M 13/03 (2006.01)
- H04J 3/12 (2006.01)

(52) U.S. Cl. .............. 714/746; 714/758; 714/701; 714/786; 370/528

(58) Field of Classification Search .............. 714/755, 714/786, 701, 710, 752
See application file for complete search history.

(56) References Cited

U.S. PATENT DOCUMENTS

| | | | | |
|---|---|---|---|---|
| 5,182,753 A | * | 1/1993 | Dahlin et al. | 714/786 |
| 5,384,782 A | * | 1/1995 | Elms | 714/701 |
| 5,742,640 A | * | 4/1998 | Haoui et al. | 375/220 |
| 5,995,501 A | | 11/1999 | Jung et al. | 370/350 |
| 6,097,772 A | | 8/2000 | Johnson et al. | 375/346 |
| 6,430,417 B1 | | 8/2002 | Raith et al. | 455/466 |
| 6,498,936 B1 | * | 12/2002 | Raith | 455/466 |

OTHER PUBLICATIONS

3GPP TS 04.18 V8.8.0 (Jan. 2001) 3$^{rd}$ Generation Partnership Project; Technical Specification Group GSM EDGE Radio Access Network; Mobile radio interface layer 3 specification, Radio Resource Conjtrol Protocol (Release 1999).

3GPP TS 05.03 V8.6.1 (Jan. 2001) 3$^{rd}$ Generation Partnership Project; Technical Specification Group GERAN; Channel coding (Release 1999).

3GPP TS 43.051 V5.1.0 (Apr. 2001) 3$^{rd}$ Generation Partnership Project; Technical Specification Group GSM/EDGE Radio Access Network; Overall description—Stage 2; (Release 5).

* cited by examiner

*Primary Examiner*—Phung My Chung
(74) *Attorney, Agent, or Firm*—Ware, Fressola, Van Der Sluys & Adolphson LLP

(57) ABSTRACT

A method of transmitting inband signaling messages in a mobile telecommunications network using SACCH burst. In order to avoid puncturing a fixed amount of bits out of every SACCH burst for inband signaling, the 40-bit FIRE code of the SACCH is replaced with a shorter CRC code, thereby creating unused bits for carrying the messages. After the SACCH block is shortened, a plurality of dummy bits are inserted into the shortened block prior to applying a ½ convolutional code to obtain the coded block. The coded block is further interleaved, reordered and mapped into 4 SACCH bursts. The dummy bits in each SACCH block are then replaced by the inband signaling for transmission.

23 Claims, 4 Drawing Sheets

| BIT NUMBER | BURST | | | | BIT NUMBER | BURST | | | |
|---|---|---|---|---|---|---|---|---|---|
| | B1 | B2 | B3 | B4 | | B1 | B2 | B3 | B4 |
| 0 | 0 | 57 | 114 | 171 | 21 | 412 | 13 | 70 | 127 |
| 1 | 228 | 285 | 342 | 399 | 22 | 248 | 305 | 362 | 419 |
| 2 | 64 | 121 | 178 | 235 | 23 | 20 | 77 | 134 | 191 |
| 3 | 292 | 349 | 406 | 7 | 24 | 312 | 369 | 426 | 27 |
| 4 | 128 | 185 | 242 | 299 | 25 | 84 | 141 | 198 | 255 |
| 5 | 356 | 413 | 14 | 71 | 26 | 376 | 433 | 34 | 91 |
| 6 | 192 | 249 | 306 | 363 | 27 | 148 | 205 | 262 | 319 |
| 7 | 420 | 21 | 78 | 135 | 28 | 440 | 41 | 98 | 155 |
| 8 | 256 | 313 | 370 | 427 | 29 | 212 | 269 | 326 | 383 |
| 9 | 28 | 85 | 142 | 199 | 30 | 48 | 105 | 162 | 219 |
| 10 | 320 | 377 | 434 | 35 | 31 | 276 | 333 | 390 | 447 |
| 11 | 92 | 149 | 206 | 263 | 32 | 112 | 169 | 226 | 283 |
| 12 | 384 | 441 | 42 | 99 | 33 | 340 | 397 | 454 | 55 |
| 13 | 156 | 213 | 270 | 327 | 34 | 176 | 233 | 290 | 347 |
| 14 | 448 | 49 | 106 | 163 | 35 | 404 | 5 | 62 | 119 |
| 15 | 220 | 277 | 334 | 391 | 36 | 240 | 297 | 354 | 411 |
| 16 | 56 | 113 | 170 | 227 | 37 | 12 | 69 | 126 | 183 |
| 17 | 284 | 314 | 398 | 455 | 38 | 304 | 361 | 418 | 19 |
| 18 | 120 | 177 | 234 | 291 | 39 | 76 | 133 | 190 | 247 |
| 19 | 348 | 405 | 6 | 63 | 40 | 368 | 425 | 26 | 83 |
| 20 | 184 | 241 | 298 | 355 | 41 | 140 | 197 | 254 | 311 |

FIG. 2A

| BIT NUMBER | BURST B1 | B2 | B3 | B4 |
|---|---|---|---|---|
| 42 | 432 | 33 | 90 | 147 |
| 43 | 204 | 261 | 318 | 375 |
| 44 | 40 | 97 | 154 | 211 |
| 45 | 268 | 325 | 382 | 439 |
| 46 | 104 | 161 | 218 | 275 |
| 47 | 332 | 389 | 446 | 47 |
| 48 | 168 | 225 | 282 | 339 |
| 49 | 396 | 453 | 54 | 111 |
| 50 | 232 | 289 | 346 | 403 |
| 51 | 4 | 61 | 118 | 175 |
| 52 | 296 | 353 | 410 | 11 |
| 53 | 68 | 125 | 182 | 239 |
| 54 | 360 | 417 | 18 | 75 |
| 55 | 132 | 189 | 246 | 303 |
| 56 | 424 | 25 | 82 | 139 |
| 57 | SB | SB | SB | SB |
| 58 | SB | SB | SB | SB |
| 59 | 196 | 253 | 310 | 367 |
| 60 | 32 | 89 | 146 | 203 |
| 61 | 260 | 317 | 374 | 431 |

| BIT NUMBER | BURST B1 | B2 | B3 | B4 |
|---|---|---|---|---|
| 62 | 96 | 153 | 210 | 267 |
| 63 | 324 | 381 | 438 | 39 |
| 64 | 160 | 217 | 274 | 331 |
| 65 | 388 | 445 | 46 | 103 |
| 66 | 224 | 281 | 338 | 395 |
| 67 | 452 | 53 | 110 | 167 |
| 68 | 288 | 345 | 402 | 3 |
| 69 | 60 | 117 | 174 | 231 |
| 70 | 352 | 409 | 10 | 67 |
| 71 | 124 | 181 | 238 | 295 |
| 72 | 416 | 17 | 74 | 131 |
| 73 | 188 | 245 | 302 | 359 |
| 74 | 24 | 81 | 138 | 195 |
| 75 | 252 | 309 | 366 | 423 |
| 76 | 88 | 145 | 202 | 259 |
| 77 | 316 | 373 | 430 | 31 |
| 78 | 152 | 209 | 266 | 323 |
| 79 | 380 | 437 | 38 | 95 |
| 80 | 216 | 273 | 330 | 387 |
| 81 | 444 | 45 | 102 | 159 |

FIG. 2B

| BIT NUMBER | BURST B1 | B2 | B3 | B4 |
|---|---|---|---|---|
| 82 | 280 | 337 | 394 | 451 |
| 83 | 52 | 109 | 166 | 223 |
| 84 | 344 | 401 | 2 | 59 |
| 85 | 116 | 173 | 230 | 287 |
| 86 | 408 | 9 | 66 | 123 |
| 87 | 180 | 237 | 294 | 351 |
| 88 | 16 | 73 | 130 | 187 |
| 89 | 244 | 301 | 358 | 415 |
| 90 | 80 | 137 | 194 | 251 |
| 91 | 308 | 365 | 422 | 23 |
| 92 | 144 | 201 | 258 | 315 |
| 93 | 372 | 429 | 30 | 87 |
| 94 | 208 | 265 | 322 | 379 |
| 95 | 436 | 37 | 94 | 151 |
| 96 | 272 | 329 | 386 | 443 |
| 97 | 44 | 101 | 158 | 215 |
| 98 | 336 | 393 | 450 | 51 |

| BIT NUMBER | BURST B1 | B2 | B3 | B4 |
|---|---|---|---|---|
| 99 | 108 | 165 | 222 | 279 |
| 100 | 400 | 1 | 58 | 115 |
| 101 | 172 | 229 | 286 | 343 |
| 102 | 8 | 65 | 122 | 179 |
| 103 | 236 | 293 | 350 | 407 |
| 104 | 72 | 129 | 186 | 243 |
| 105 | 136 | 193 | 250 | 307 |
| 107 | 364 | 421 | 22 | 79 |
| 108 | 200 | 257 | 314 | 371 |
| 109 | 428 | 29 | 86 | 143 |
| 110 | 264 | 321 | 378 | 435 |
| 111 | 36 | 93 | 150 | 207 |
| 112 | 328 | 385 | 442 | 43 |
| 113 | 100 | 157 | 214 | 271 |
| 114 | 392 | 449 | 50 | 107 |
| 115 | 164 | 221 | 278 | 335 |

FIG. 2C

METHOD OF TRANSMITTING SIGNALING MESSAGES IN A MOBILE TELECOMMUNICATIONS NETWORK

FIELD OF THE INVENTION

The present invention relates generally to a method for transmitting signaling messages between a base transceiver station and a mobile station and, more particularly, to inband signaling.

BACKGROUND OF THE INVENTION

During voice and data transmission, signaling messages are also conveyed over the air interface in addition to user data. Signaling messages allow the network and the mobile station to discuss the management of importance issues, such as resources and handovers. When traffic is ongoing, signaling messages are carried through the Associated Control Channels (ACCH). The Slow Associated Control Channel (SACCH) is used for non-urgent procedures—mainly for the transmission of radio measurement data needed for handover decisions on a dedicated physical subchannel. The SACCH has the particularity that continuous transmission must occur in both directions. The SACCH is actually always present on dedicated physical subchannels (3GPP TS 43.051 v5.1.0 Release 5). As specified in "Digital Cellular Telecommunications System (Phase 2+), Mobile Radio Interface Layer 3 Specification, Radio Resource Control Protocol" (GSM 04.18 v8.8.0 Release 1999), each SACCH block conveys: 1) one physical layer header of two octets (the physical layer implements a peer-to-peer protocol for the control of timing advance and power control at the operation on dedicated physical sub-channels, and 2) one Layer 2 frame of 21 octets. Thus, each SACCH block contains 184 information bits. When a 40-bit FIRE code and a 4-bit tail section are added to the information bits, the block code contains 228 bits. After the block code is encoded with a ½ convolutional code (of which the constraint length is 5) and interleaved, the coded SACCH block contains 456 bits reordered and partitioned into 4 blocks, each of which contains 114 bits of interleaved data. Each block is then mapped onto one burst of which the stealing flags are set to "1" (GSM TS 05.03 v8.6.1 Release 1999).

It has been proposed that a fixed amount of bits out of every SACCH burst is punctured in order to convey some signaling messages at a rate of once every 120 ms. However, such puncturing decreases the link level performance of the SACCH.

It is advantageous and desirable to provide a method of inband signaling using the SACCH without decreasing the link level performance of the SACCH.

SUMMARY OF THE INVENTION

As mentioned earlier, the SACCH block of 184 information bits are linked with a 40-bit FIRE code for error correction and detection. In the method, according to the present invention, instead of using the FIRE code for error correction and detection, a shorter Cyclic Redundancy Check (CRC) code is used. By replacing the 40-bit FIRE code with a shorter CRC code, there would be extra bits in the interleaved block available for inband signaling.

Accordingly, the present invention provides a method of signaling messages between a mobile station and a base transceiver station in a telecommunications network using a control channel in air-interface for carrying information in blocks, wherein each block contains the carried information, and a first error correction/detection code having a first number of bits. The method comprises the step of:

substituting the first error correction/detection code in the block with a second error detection code having a second number of bits smaller than the first number for obtaining a shortened block;

applying a convolutional code to the shortened block for obtaining a coded shortened block;

inserting a plurality of dummy bits into the coded shortened block in pre-defined bit locations for obtaining a modified coded block;

rearranging the bits in the modified coded block in an interleaving manner for obtaining an interleaved block containing the dummy bits in further bit locations determinable from the pre-defined bit locations; and replacing the dummy bits in the interleaved block with bits indicative of the messages to be signaled between the mobile station and the base station.

Preferably, the control channel is a slow associated control channel (SACCH).

Furthermore, the interleaved block is partitioned into 4 blocks, and each block is mapped onto a SACCH burst containing two bits of stealing flags.

Preferably, the dummy bits always have the same positions within each SACCH burst.

Preferably, the convolutional code is a ½ rate convolutional code.

Preferably, a plurality of tail bits are added to the SACCH block prior to applying the convolutional code to the shortened block.

The present invention will become apparent upon reading the description taken in conjunction with FIG. 1.

BRIEF DESCRIPTION OF THE DRAWINGS

FIG. 2A is the first part of a table showing the bit locations of dummy bits in a SACCH burst.

FIG. 2B is the second part of the table showing the bit locations of dummy bits in a SACCH burst.

FIG. 2C is the last part of the table showing the bit locations of dummy bits in a SACCH burst.

DETAILED DESCRIPTION OF THE INVENTION

Figure 1:
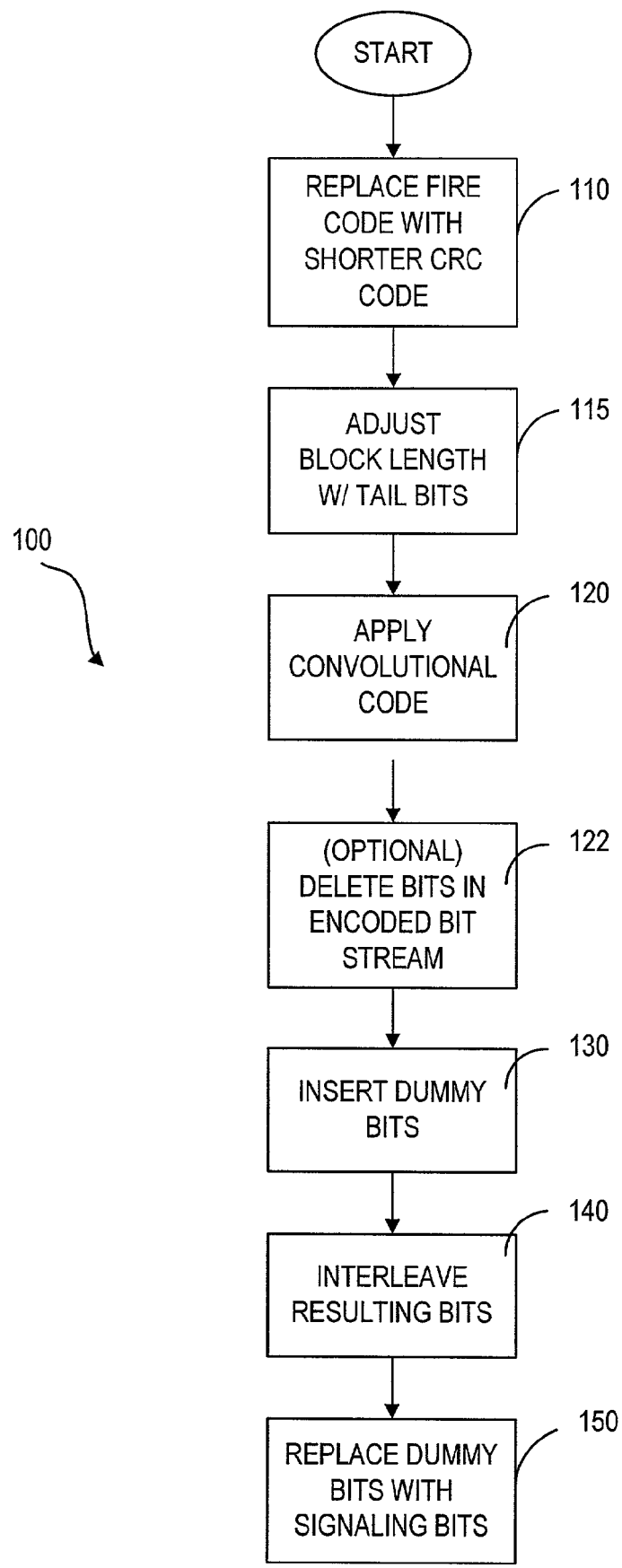
FIG. 1 is a flow chart illustrating the method of inband signaling, according to the present invention.

It is well known to add to user data some redundant information calculated from the user data in a coding process in order to detect the presence of errors in a receiver. In Global System for Mobile Communication (GSM), a convolutional code is used to code the user data for that purpose. In addition, a 40-bit FIRE code is used for the detection and correction of bursty errors. Furthermore, an interleaving procedure is used to distribute or interlace the bits in the bitstream onto a number of bursts. Interleaving is used to prevent complete loss of the transmitted data when a whole burst is corrupted.

Regarding SACCH, when the user data is delivered to the encoder for channel coding, the data is delivered on a burst mode having a fixed size of 184 information bits: d(0), d(1), . . . d(183). The block of 184 information bits is protected by 40 extra bits against errors. These bits are added to the 184 bits according to a shortened binary cyclic code (FIRE code) using the generator polynomial:

$$g(d)=(D^{23}+1)*(D^{17}+D^3+1)$$

where $D^j$'s are the data symbols delivered to the encoding unit.

The encoding of the cyclic code is performed in a systematic form as shown in the polynomial below:

$$d(0)D^{223}+d(1)D^{222}+\ldots+d(183)D^{40}+p(1)D^{38}+\ldots+p(38)D+p(39)$$

where $\{p(0), p(1), \ldots, p(39)\}$ are the parity bits, when divided by g(D) yields a remainder equal to:

$$1+D+D^2+\ldots+D^{39}.$$

Furthermore, four tail bits equal to 0 are added to the information and parity bits, the result being a block of 228 bits.

$$u(k)=d(k) \text{ for } k=0,1,\ldots,183$$

$$u(k)=p(k-184) \text{ for } k=184,185,\ldots,223$$

$$u(k)=0 \text{ for } k=224,225,226,227 \text{ (tail bits)}$$

This block of 228 bits is encoded with the ½ rate convolutional code defined by the polynomials:

$$G0=1+D^3+D^4$$

$$G1=1+D+D^3+D^4$$

This results in a block of 456 coded bits: $\{c(0), c(1), \ldots, c(455)\}$ defined by:

$$c(2k)=u(k)+u(k-3)+u(k-4)$$

$$c(2k+1)=u(k)+u(k-1)+u(k-3)+u(k-4) \text{ for } k=0,1,\ldots, 227; u(k)=0 \text{ for } k<0$$

The coded bits are reordered and interleaved according to the following rule:

$$i(B,j)=c(n,k) \text{ for } k=0,1,\ldots,455$$

$$n=0,1,\ldots,N,N+1,\ldots$$

$$B=B_0+4n+(k \bmod 4)$$

$$j=2((49k)\bmod 57)+((k \bmod 8) \text{div } 4)$$

where B is used for numbering the bursts or block and $B_0$ marks the first burst or block carrying bits from the data block with n=0, which is the first data block in the transmission. The result of the reordering of bits can be seen from the evaluation of the bit number-index j, distributing the 456 bits over 4 blocks on even numbered bits and 4 blocks on odd numbered bits. The resulting 4 blocks are built by putting blocks with even numbered bits and blocks with odd numbered bits together into one block.

The block of coded data is interleaved "block rectangular" where a new data block starts every $4^{th}$ block and is distributed over 4 blocks.

When mapping on a burst, the mapping is given by the rule:

$$e(B,j)=i(B,j) \text{ and } e(B,59+j)=i(B,57+j) \text{ for } j=0,1,\ldots,56$$

and $$e(B,57)=hl(B) \text{ and } e(B,58)=hu(B)$$

where e(B,j)'s denote the bits in one burst and i(B,j)'s denote interleaved data bits. The two bits labeled hl(B) and hu(B) on burst number B are "stealing flags" used for indication of control channel signaling. The stealing flags are labeled SB in FIG. 2B. Currently, they are set to "1" for a SACCH.

The method, according to the present invention, uses a different error detection code to protect user data. Instead of using the 40-bit FIRE code, a shorter Cyclic Redundancy Check (CRC) code is used. CRC codes are well known in the art. By replacing the FIRE code with a CRC code, there are a number of bits available for conveying signaling messages.

Referring now to FIG. 1, the procedure for the transmission of the SACCH message is as follows. For every SACCH block containing 184 information bits, 40 FIRE code bits and 4 tail bits (with a total of 228 bits), the FIRE code is replaced with a shorter CRC code or any other shorter error detection code, at step 110. A plurality of tail bits are added to the SACCH block prior to the constraint length being used for the convolutional code, at step 115. This shortened SACCH block is encoded with a ½ convolutional code with same or higher constraint length for obtaining a coded shortened SACCH block, at step 120. In order to keep the block interleaver over 456 bits, a plurality of dummy bits is inserted within the coded shortened SACCH block, at step 130. The whole block including the dummy bits is then interleaved and reordered into data blocks of 4 bursts, at step 140. The bursts are denoted by B1, B2, B3 and B4 in FIGS. 2A–2C. It should be noted that the interleaving step of 140 is identical to the one defined in GSM TS 05.03 v.8.6.0 Release 1999. It should also be noted that the insertion of the dummy bits at step 120 is carried out in such a way that after the interleaving step of 140, they always have the same positions within a SACCH burst. For example, if 40 dummy bits are inserted within the coded shortened SACCH block at step 130, these dummy bits occupy the same positions denoted by the bit numbers 47, 49, 51, 53, 55, 60, 62, 64, 66 and 68, as shown in FIG. 2B. Finally, at step 150, the dummy bits are replaced by bits representative of signaling messages for inband signaling on every burst. The signaling message can be a Fast Power Control (FPC) signal, for example.

It should be noted that the 8 bits of the stealing flags (bit numbers 57 and 58 in FIG. 2B) are set to '1' as they are not currently used. These stealing flag bits can be replaced by bits representative of signaling messages, if so desired. Furthermore, one or more bits in the encoded block can be deleted or punctured, at step 125, in order to convey inband signaling.

The shorter CRC code that is used to replace the 40-bit FIRE code can have 20 bits, for example. Preferably, the length of the CRC code ranges from 12 to 30 bits. However, it is also possible to use a shorter or longer CRC code. For example, if 10 bits per burst are needed for inband signaling, and a 20-bit CRC code is used to replace the 40-bit fire code, 4 bits have to be deleted or punctured when the constraint length of the convolutional code is increased (from 5 bits) to 7 bits and stealing flags are not used. Accordingly, the number of bits in the SACCH block in various steps are as follows:

| | | |
|---|---|---|
| in the shortened SACCH block: | 184 + 20 = 204 | (step 110) |
| in the modified shortened SACCH block: | 204 + 6 = 210 | (step 115) |
| in the coded block: | 210 × 2 = 420 | (step 120) |
| in the punctured coded block: | 420 − 4 = 416 | (step 125) |
| in the modified coded block: | 416 + 40 = 456 | (step 130) |

The number of bits in the interleaved block after step 140 and in the replaced block after step 150 is also 456.

Another example: if 12 bits per burst are needed for inband signaling, and an 18-bit CRC code is used to replace the 40-bit fire code, no bit needs to be punctured when the constraint length of the convolutional code is increased to 7 bits and both stealing flags are used. The number of bits are as follows:

| | | |
|---|---|---|
| in the shortened SACCH block: | 184 + 18 = 202 | (step 110) |
| in the modified shortened SACCH block: | 202 + 6 = 208 | (step 115) |
| in the coded block: | 208 × 2 = 416 | (step 120) |
| in the punctured coded block: | 416 − 0 = 416 | (step 125) |
| in the modified coded block: | 416 + 40 = 456 | (step 130) |

The number of bits in the interleaved block after step 140 and in the replaced block after step 150 remains unchanged.

It should be noted that the number of bits in the modified coded block after step 130 is 456, identical to the number of bits in the original SACCH block, which carries 184 information bits, 40 FIRE code bits and 4 tail bits. Thus, the same interleaver can be used to rearrange the bits at step 140. Furthermore, it is preferable to increase the constraint length in order to maintain the block error rate performance (BLER) as well as the error detection performances. Thus, in the two examples described above, the constraint length is increased from 5 to 7 bits. However, the constraint length can be longer than 7 bits if further improvement of the BLER is necessary or desired.

The present invention as described in conjunction with FIG. 1 is related to procedure for conveying the SACCH message on the transmit side. The procedure of the receive side is as follows:

Read the inband signaling on the fixed positions on each SACCH burst, wherein the positions include the replaced dummy bits and the possible stealing bits and additional punctured bits;

De-interleave the 456 bits blocks; and

Decode the SACCH block without the dummy bits.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of signaling messages between a mobile station and a base transceiver station in a telecommunications network using a control channel in air-interface for carrying information in blocks, wherein each block contains the carried information and a first error correction/detection code having a first number of bits, said method comprising:

substituting the first error correction/detection code in the block with a second error detection code having a second number of bits smaller than the first number for obtaining a shortened block having a plurality of available bits for transmission; and placing further bits into at least part of the available bits, wherein the further bits are indicative of the messages to be signaled between the mobile station and the base station.

2. The method of claim 1, further comprising:

applying a convolutional code to the shortened block for obtaining a coded shortened block prior to placing the further bits into the available bits.

3. The method of claim 2, further comprising:

inserting a plurality of dummy bits into at least part of the available bits in the coded shortened block in pre-defined bit locations for obtaining a modified coded block;

rearranging the bits in the modified coded block in an interleaving manner for obtaining an interleaved block containing the dummy bits in further bit locations determinable from the pre-defined bit locations; and replacing the dummy bits in the interleaved block with the further bits.

4. The method of claim 3, wherein the control channel comprises a slow associated control channel (SACCH).

5. The method of claim 4, wherein the interleaved block is partitioned into a plurality of further blocks, and each further block is mapped onto a SACCH burst containing a plurality of stealing flags, and wherein the dummy bits always have the same positions within each SACCH burst.

6. The method of claim 5, further comprising puncturing one or more bits in the SACCH burst for conveying the messages.

7. The method of claim 5, wherein the stealing flags are unused, and the unused stealing flags in the SACCH burst can be used for conveying the messages.

8. The method of claim 3, wherein the SACCH block containing the carried information and the first error correction/detection code also contains a plurality of tail bits, resulting in a first total number of bits, and wherein the modified coded block contains a second total number of bits equal to the first total number.

9. The method of claim 8, wherein an interleaver is used to rearrange the SACCH block having the first total number of bits for transmission, and said interleaver is also used to rearrange the modified coded block for transmission.

10. The method of claim 3, wherein the convolutional code is a ½ convolutional code having a constraint length, said method further comprising:

adjusting the length of the shortened block with tail bits prior to said applying; and adjusting the coded shortened block to accommodate the constraint length prior to said inserting, and wherein the SACCH block contains the carried information, the first error correction/detection code, and further contains a plurality of further tail bits, resulting in a first total number of bits, and wherein the modified coded block contains a second total number of bits equal to the first total number.

11. The method of claim 10, wherein an interleaver is used to rearrange the SACCH block having the first total number of bits for transmission, and said interleaver is also used to rearrange the modified coded block for transmission.

12. The method of claim 2, wherein the convolutional code is a ½ convolutional code.

13. The method of claim 12, wherein the convolutional code has a constraint length of 7 bits.

14. The method of claim 13, further comprising adjusting the length of the coded shortened block to accommodate the constraint length prior to the inserting step.

15. The method of claim 2, further comprising adjusting the length of the shortened block with tail bits prior to said applying.

16. The method of claim 1, wherein the first error correction/detection code is a FIRE code and the second error detection code is a cyclic redundancy check (CRC) code.

17. The method of claim 1, wherein the second number of bits ranges from 12 to 30.

18. The method of claim 1, wherein the messages include a fast power control signal.

19. A method of signaling messages between a mobile station and a base transceiver station in a telecommunications network using a slow associated control channel (SACCH) for carrying information in blocks, wherein each block contains the carried information and a first error correction/detection code having a first number of bits, said method comprising:

replacing the first error correction/detection code in the block with a second error detection code having a second number of bits smaller than the first number for obtaining a shortened block;

applying a convolutional code to the shortened block for obtaining a coded shortened block;

inserting a plurality of dummy bits into the coded shortened block in pre-defined bit locations for obtaining a modified coded block;

rearranging the bits in the modified coded block in an interleaving manner for obtaining an interleaved block containing the dummy bits in further bit locations determinable from the pre-defined bit locations; and replacing the dummy bits in the interleaved block with bits indicative of the messages to be signaled between the mobile station and the base station.

20. The method of claim 19, wherein the convolutional code has a contraint length, said method further comprises adjusting the length of the shortened block with tail bits prior to said applying and adjusting the coded shortened block based on the constraint length prior to said inserting.

21. An apparatus for signaling messages between a mobile station and a base transceiver station in a telecommunications network using a control channel in air-interface for carrying information in blocks, wherein each block contains the carried information and a first error correction/detection code having a first number of bits, said apparatus comprising:

means for substituting the first error correction/detection code in the block with a second error detection code having a second number of bits smaller than the first number for obtaining a shortened block having a length;

means for adjusting the length of the shortened block with tail bits for obtaining a modified shortened block;

means for applying a convolutional code to the modified shortened block for obtaining a coded shortened block;

means for inserting a plurality of dummy bits into the coded shortened block in pre-defined bit locations for obtaining a modified coded block;

means for rearranging the bits in the modified coded block in an interleaving manner for obtaining an interleaved block containing the dummy bits in further bit locations determinable from the pre-defined bit locations; and means for replacing the dummy bits in the interleaved block with bits indicative of the messages to be signaled between the mobile station and the base station.

22. The apparatus of claim 21, further comprising means for adjusting the length of the coded shortened block with further bits prior to inserting the dummy bits into said coded shortened block.

23. The apparatus of claim 21, wherein the control channel is a slow associated control channel (SACCH).

\* \* \* \* \*

UNITED STATES PATENT AND TRADEMARK OFFICE
CERTIFICATE OF CORRECTION

PATENT NO. : 7,240,270 B2 Page 1 of 1
APPLICATION NO. : 09/845823
DATED : July 3, 2007
INVENTOR(S) : Bellier et al.

It is certified that error appears in the above-identified patent and that said Letters Patent is hereby corrected as shown below:

Column 7, line 27, claim 20, line 2, "contraint" should be --constraint--.

Signed and Sealed this

First Day of April, 2008

JON W. DUDAS
*Director of the United States Patent and Trademark Office*